(12) United States Patent
Sugiura et al.

(10) Patent No.: US 6,878,086 B2
(45) Date of Patent: Apr. 12, 2005

(54) AUTOMATIC TRANSMISSION

(75) Inventors: Nobutada Sugiura, Anjo (JP); Futomi Hanji, Anjo (JP); Hiroyuki Tsukamoto, Anjo (JP); Kazuhisa Ozaki, Anjo (JP); Youichi Hayakawa, Anjo (JP); Keizo Kobayashi, Anjo (JP); Kazutoshi Nozaki, Toyota (JP); Yoshinobu Nozaki, Toyota (JP); Yuuji Kashihara, Toyota (JP)

(73) Assignees: Aisin Aw Co., Ltd. (JP); Toyota Jidosha Kabushiki Kaisha (JP)

( * ) Notice: Subject to any disclaimer, the term of this patent is extended or adjusted under 35 U.S.C. 154(b) by 25 days.

(21) Appl. No.: 10/321,838

(22) Filed: Dec. 18, 2002

(65) Prior Publication Data
US 2003/0139246 A1 Jul. 24, 2003

(30) Foreign Application Priority Data
Dec. 25, 2001 (JP) ........................................ 2001-391423

(51) Int. Cl.$^7$ ............................................. F16H 31/00
(52) U.S. Cl. ..................... 475/279; 475/120; 475/121
(58) Field of Search ............................... 475/279, 114, 475/116, 118, 120, 121, 290, 291, 292, 293, 317, 318

(56) References Cited

U.S. PATENT DOCUMENTS

| | | | | |
|---|---|---|---|---|
| 2,576,336 A | * | 11/1951 | Farkas | 477/60 |
| 3,581,858 A | * | 6/1971 | Haley | 192/106 F |
| 4,237,749 A | * | 12/1980 | Koivunen | 475/281 |
| 4,957,195 A | * | 9/1990 | Kano et al. | 192/106 F |
| 4,982,826 A | * | 1/1991 | Holbrook | 192/106 F |
| 5,006,102 A | * | 4/1991 | Takase et al. | 475/282 |
| 5,069,657 A | * | 12/1991 | Taniguchi et al. | 475/283 |
| 5,090,950 A | * | 2/1992 | Sugano et al. | 475/129 |
| 5,203,862 A | * | 4/1993 | Nishida et al. | 475/282 |
| 5,662,198 A | * | 9/1997 | Kojima et al. | 192/87.11 |
| 6,139,463 A | * | 10/2000 | Kasuya et al. | 475/275 |

FOREIGN PATENT DOCUMENTS

| | | | | |
|---|---|---|---|---|
| JP | 62093546 A | * | 4/1987 | F16H/3/36 |
| JP | 04-285347 | | 9/1992 | |
| JP | 09-032919 | | 7/1994 | |

* cited by examiner

*Primary Examiner*—Tisha Lewis
(74) *Attorney, Agent, or Firm*—Lorusso, Loud & Kelly

(57) ABSTRACT

Second and third clutches are axially aligned so that the back side of the second clutch and the front side of the third clutch oppose each other, and a first clutch is positioned radially inward of the second and third clutches. Further, a clutch drum is extended so as to be used in common by the second and third clutches, the second clutch is engaged and disengaged from the axial front side by a second piston of a second oil pressure actuator, and the third clutch is engaged and disengaged from the axial rear side by a third piston of a third oil pressure actuator. The first through third clutches are positioned in a compact manner and can be independently operated.

26 Claims, 10 Drawing Sheets

Operational Table

|   | C1 | C2 | C3 | B1 | B2 | B3 | B4 | F1 | F2 | F3 |
|---|----|----|----|----|----|----|----|----|----|----|
| P |   |   |   |   |   |   |   |   |   |   |
| REV |   |   | O | (O) |   |   | O | O |   |   |
| N |   |   |   |   |   |   |   |   |   |   |
| 1ST | O |   |   |   |   |   | (O) |   |   | O |
| 2ND | O |   |   | (O) | (O) | O |   | O | O |   |
| 3RD | O |   | O | (O) |   | ● |   | O |   |   |
| 4TH | O | O | ● |   |   | ● |   |   |   |   |
| 5TH |   | O | O | O |   | ● |   |   |   |   |
| 6TH |   | O |   | ● | O | ● |   |   |   |   |

(O) indicates when there is engine braking,

● indicates when engaged but there is no torque transmission

FIG.6

Operational Table

|   | C1 | C2 | C3 | C4 | B1 | B2 | B3 | B4 | F0 | F1 | F2 | F3 |
|---|----|----|----|----|----|----|----|----|----|----|----|----|
| P |    |    |    |    |    |    |    |    |    |    |    |    |
| REV |  |    | O  | (O)|    |    | O  |    | O  |    |    |    |
| N |    |    |    |    |    |    |    |    |    |    |    |    |
| 1ST | O |  |    | (O)|    |    | (O)| O  |    |    |    | O  |
| 2ND | O |  |    | (O)| (O)| O |    |    | O  | O  | O  |    |
| 3RD | O |  | O  | (O)| (O)|    | ●  |    | O  | O  |    |    |
| 4TH | O | O | ● | (O)|    |    | ●  |    | O  |    |    |    |
| 5TH | ● | O | O |    | O  |    | ●  |    |    |    |    |    |
| 6TH | ● | O |    |    | ●  | O  | ●  |    |    |    |    |    |

(O) indicates when there is engine braking,

● indicates when engaged but there is no torque transmission

AUTOMATIC TRANSMISSION

BACKGROUND OF THE INVENTION

1. Field of the Invention

The invention relates to an automatic transmission for an automobile, and is particularly applicable to an automatic transmission in which plural clutches are closely positioned. More particularly, the invention relates to the structure of such a clutch section.

2. Related Art

Automatic transmissions for vehicles, such as automobiles having a structure wherein plural clutches are closely ("collectively") positioned are known. For example, a structure in which three clutches C1, C2 and C3 that operate independently when a vehicle moves forward and that are collectively disposed on the front side of a gear section having a plurality of planetary gear units is disclosed in FIG. 5 and FIG. 7 of Japanese Patent Application Laid-Open No. 4-285347. This structure is capable of providing six forward shift speeds because, as mentioned above, each of the three clutches C1, C2 and C3 is independently operated.

While multi-speed automatic transmissions are in demand in order to improve fuel consumption, greater compactness is also demanded. However, a greater number of speeds and compact size are not compatible in an automatic transmission.

In the above-mentioned related art, in order to independently operate the three clutches C1, C2 and C3, the three clutches C1, C2 and C3 need to be independently structured. However, because it is necessary to combine the positions of the three clutches C1, C2 and C3 to provide an engagement state for each shift speed, it is difficult to have a compact structure. Therefore, even if the six forward shift speeds are achieved, the overall size of the automatic transmission is increased. In other words, it is difficult to achieve a multi-speed transmission in a compact size with the structure shown in the above-mentioned related art.

SUMMARY OF THE INVENTION

Accordingly, an object of the invention is to provide an automatic transmission in which three clutches that engage when moving forward are positioned in close proximity ("collectively positioned") and two clutches are radially aligned, with the third clutch positioned radially inward of the other two clutches, thereby solving the above-mentioned problems. In other words, the object of the invention is to provide an automatic transmission having both multiple speeds and compactness.

In one aspect the present invention (for example, refer to FIG. 1 and FIG. 3), provides an automatic transmission that extends from a front end to a rear end and that changes the power transfer path through a gear assembly, and thereby changes the rotational speed of an input member to one of a plurality of shift speeds (for example, six forward speeds and one reverse speed). The transmission transmits the rotation of the input member to an output member using a clutch and a holding unit. At least a first clutch, a second clutch and a third clutch which transfer the rotation of the input member to different rotational elements of the gear assembly, and which are engaged when moving forward are collectively positioned along with a first oil pressure actuator, a second oil pressure actuator, and a third oil pressure actuator, respectively operating the three clutches, to form a clutch section. The second and third clutches are axially aligned so that the back side of the second clutch and the front side of the third clutch oppose each other, and the first clutch is positioned radially inward of the second and third clutches. An axially extended drum portion serves as a clutch drum for both the second and third clutches. By engaging and disengaging the second clutch from the axial front side using the second oil pressure actuator, and by engaging and disengaging the third clutch from the axial back side using a third oil pressure actuator, the first, second and third clutches are separately engaged and disengaged by the first, second and third oil pressure actuators, respectively.

By axial alignment of the second and third clutches so that the back side of the second clutch and the front side of the third clutch oppose each other, and by positioning the first clutch radially inward of the second and third clutches, the three clutches are compactly positioned, the axial dimension can be shortened and the automatic transmission can be made more compact overall.

Also, because the second and third clutches share a drum in common, one clutch drum can be omitted and the number of parts is thereby reduced and the automatic transmission made more compact.

Further, by engaging and disengaging the second clutch from the front side by the second oil pressure actuator, and by engaging and disengaging the third clutch from the back side using the third oil pressure actuator, even when the clutch drum is shared in common as described above, the second and third clutches can be separately engaged and disengaged by the second and third oil pressure actuators, respectively. In other words, the first, second and third clutches can each be independently operated. This makes it possible to increase the number of shift speeds by one speed. For example, a transmission that conventionally had five forward speeds can be made to have six forward speeds.

The automatic transmission according to the present invention may be structured such that a clutch drum has a flange portion on its front end side, which flange is sandwiched between a second piston of the second oil pressure actuator positioned on the back side, and a third piston of the third oil pressure actuator positioned on the front side. Further, a portion of the third piston is axially extended to the back side, along the outer surface of the drum to the back side of the third clutch for engaging same. Therefore, according to the present invention, by sandwiching the flange portion of the shared clutch drum between the second piston of the second oil pressure actuator positioned on the back side, and the third piston of the third oil pressure actuator positioned on the front side, and further, by axially extending a portion of the third piston to the back side axially along the outer surface of the drum to the back side of the third clutch, the second clutch can be operated from its front side by the second piston, and the third clutch can be operated from its back side by the third piston. In other words, the second clutch is pressed from the front side, toward the back side, by the second piston, and, in reverse, the third clutch is pulled from the back side to the front side by the third piston, whereby they can be engaged and disengaged. By adopting this structure, the automatic transmission can be made very compact, and it is possible to independently operate the second and third clutches. In other words, the third oil pressure actuator has its oil pressure chamber, and piston head therein, located at one axial end of the second clutch and a piston extension, in the form of a drum or skirt, extends from the piston head, axially along ran exterior (outer) surface of the drum shared by the second and third clutches, to an engaging element or flange portion located at an axial end of the third clutch for engaging the third clutch. Thus, the head and engaging element of the third piston are axially opposed, at opposite ends of the axially aligned second and third clutches.

The automatic transmission according to the present invention may also be structured such that a second oil pressure chamber is formed between a flange portion of the clutch drum and the second piston, and a third oil pressure chamber is formed between the flange portion and the third piston. Therefore, in accordance with the present invention, by forming the second oil pressure chamber between the flange portion of the clutch drum and the second piston, and by forming the third oil pressure chamber between the same flange portion and the third piston, in addition to the shared use of the clutch drum by the second and third clutches as described above, the oil pressure actuators can share a portion in common, which allows the automatic transmission to be made even more compact.

The automatic transmission of the present invention may be structured such that the rotational speed of the input member is changed to the highest speed (for example, sixth speed) from among the plurality of shift speeds and the rotation is transmitted to the output member by draining the oil pressure of the third oil pressure chamber to disengage the third clutch. Therefore, in the present invention, shifting to the highest speed is achieved by draining the oil pressure from the third oil pressure chamber to disengage the third clutch while the second clutch remains engaged. As a result, as described in more detail later, it is possible to increase the number of shift speeds by one speed.

The automatic transmission according to the present invention may have the first clutch positioned so that it and the third clutch axially overlap, with the first clutch radially inward of the third clutch. Therefore, according to the present invention, the position of the first clutch, which is on the inner side of the second and third clutches, is further limited, and the first clutch is positioned so it and the third clutch respectively axially overlap on the inner side of the third clutch.

The automatic transmission of the present invention may have a third hub of the third clutch positioned on the inner side of the third clutch, a second hub of the second clutch positioned on the inner side of the third hub, and the first clutch positioned on the inner side of the second hub. In other words, the third clutch, the third hub, the second hub and the first clutch are positioned in order from the radially outer side to the inner side, i.e., toward the axial center of the transmission.

The automatic transmission of the present invention may be structured such that the first clutch is engaged at or below one forward speed in a directly connected stage (for example, the fourth speed), the second clutch is engaged at or above that same speed in the directly connected stage, the third clutch is engaged in at least one of the forward speeds (for example, the third speed and the fifth speed) and in the reverse speed, whereby at least five forward speeds and one reverse speed are achieved. Therefore, according to the present invention, by engaging the first clutch at or below the directly connected stage, engaging the second clutch at or above the directly, connected stage, and engaging the third clutch for at least one forward speed, five forward speeds and one reverse speeds are achieved. In other words, it is possible to make the automatic transmission more compact while achieving these six speeds.

The automatic transmission according to the present invention may have the first clutch engaged in the first through fourth forward speeds, the second clutch engaged in at least the fourth and fifth speeds, the third clutch engaged in the third and fifth forward speeds and in reverse speed, to achieve at least five forward speeds and one reverse speed. Therefore, shift speeds at which the first, second and third clutches are engaged are further limited, and the first, second and third clutches are engaged in the first through fourth speeds, the fourth and fifth speeds, and the third and fifth speeds, respectively.

Further, the automatic transmission according to the present invention may have the first piston of the first actuator positioned on the axial front side of the first clutch, and on the inner side of the second clutch.

In preferred embodiments the automatic transmission of the present invention may have a first cancel plate that defines a first cancel chamber between itself and the first piston and that is positioned at the rear side of the first piston. The first clutch drum has a flange portion that defines a first oil pressure chamber between itself and the first piston and that is positioned on the front side of the first piston. A second cancel plate of the second actuator is positioned on the front side of the flange portion of the first clutch drum, while the second piston defines a second cancel chamber between itself and the second cancel plate and is positioned on the front side of the second cancel plate, and a flange portion of the clutch drum of the second and third clutches, defining a second oil pressure chamber between itself and the second piston, is positioned on the front side of the second piston. Therefore, according to such embodiments of the invention, because the second cancel chamber is formed between the second cancel plate and the second piston, allowing compactness of the clutch section, and the oil pressure that is supplied to the second clutch can be reliably canceled.

Further, the automatic transmission according to the present invention may include a first planetary gear unit that is a dual planetary gear unit and second and third planetary gear units that are simple planetary gear units, the first, the second, and third planetary gear units being interposed between the first, the second and the third clutches and the output member; and first, second, third and fourth holding units that are engaged and disengaged with rotational elements of the first, the second and the third planetary gear units. The first holding unit is a combination of a first brake and a first one-way clutch, the second holding unit is a second brake, the third holding unit is a combination of a third brake and a second one-way clutch; and the fourth holding unit is a combination of a fourth brake and a third one-way clutch. Further, in such embodiments a member (intermediate shaft) on the output side of the first clutch may be; integrally formed with sun gears of the second and the third planetary gear units, a member (second sleeve shaft) on the output side of the second clutch may be integrally formed with a carrier of the second planetary gear unit and a ring gear of the third planetary gear unit is engaged and disengaged by the fourth holding unit. Still further, the member on the output side of the third clutch may be integrally formed with a sun gear of the first planetary gear unit which is engaged and disengaged by the third holding unit. The first holding units may be engaged with and disengaged from a carrier of the first planetary gear set and the ring gears of the first and second planetary gear sets may be integrally formed and engaged and disengaged by the second holding unit. A carrier of the third planetary gear set may be integrally formed with the output member. A first forward speed is achieved by engagement of the first clutch and the fourth holding units, a second forward speed is achieved by the engagement of the first clutch and the first and the third holding units, a third forward speed is achieved by engagement of the first and the third clutches and the first holding units, a fourth forward speed is achieved by engagement of the first and the second clutches, a fifth forward speed is achieved by engagement of the second and third clutches and the first holding units, and reverse speed is achieved by engagement of the third clutch and the first and the fourth holding units. Therefore, the clutch section is compact, and it is possible to provide the automatic transmission with five forward speeds and one reverse speed.

The automatic transmission of the present invention may also have a sixth forward speed achieved by the engagement of the second clutch and the second holding unit. Therefore, according to the present invention, the clutch section is compact and allows for six forward speeds and one reverse speed.

The automatic transmission according to other preferred embodiments of the present invention has the fourth clutch axially aligned with and located on the front side of the first clutch. Further, the input side elements of the first and fourth clutches are integrally structured, the output side member of the fourth clutch and the sun gears of the second and third planetary gear units are integrally structured, and a one-way clutch is interposed between the output side member of the first clutch and the output side member of the fourth clutch. Therefore, because shifting between the fourth and fifth speeds can be carried out using the one-way clutch, it is possible to improve control. Also, a transmission in which the four clutches (first, second, third and fourth clutches) are collectively positioned can be compactly structured and at least the first and third clutches can be independently operated.

BRIEF DESCRIPTION OF THE DRAWINGS

FIG. 6 is a diagram illustrating operation of the multi-speed change mechanism of the first embodiment;

FIG. 10 is a diagram illustrating operation of the multi-speed change mechanism of the second embodiment.

DESCRIPTION OF THE PREFERRED EMBODIMENTS

A first embodiment of the invention will be described with reference to FIGS. 1–7. In FIG. 1 through FIG. 4, the left side is the front side (forward) and the right side is the rear side (back side).

Figure 1:
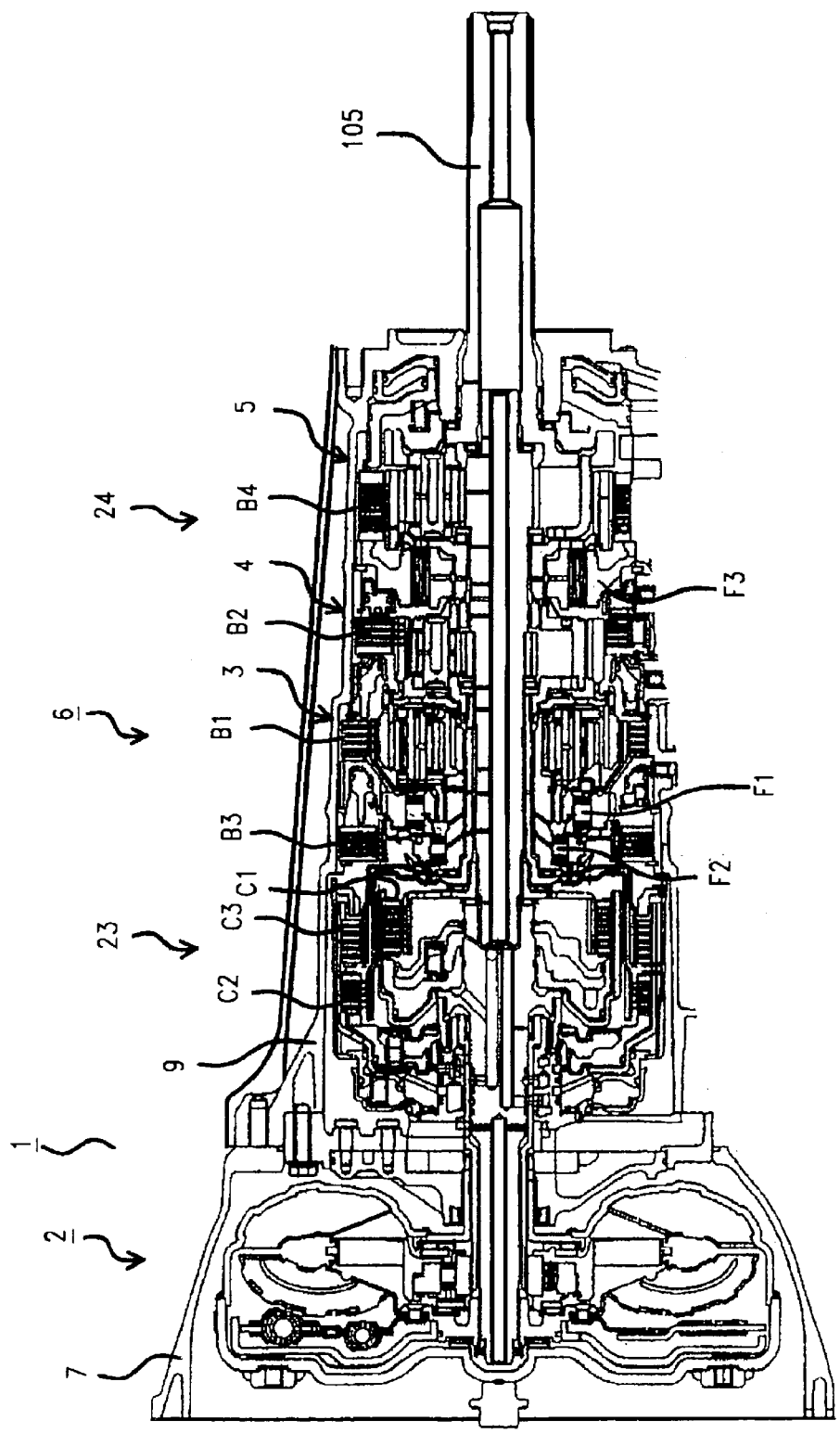
FIG. 1 is a cross-section of an entire automatic transmission according to a first embodiment of the present invention.

The automatic transmission, as shown in FIG. 1, is provided with a torque converter 2, and a multi-speed change mechanism 6 having three planetary gear sets (a first planetary gear set 3, a second planetary gear set 4, and a third planetary gear set 5), wherein the torque converter 2 and the multi-speed change mechanism 6 are aligned on one axle, and is housed in a case that integrates a converter housing 7 and a transmission case 9.

Figure 2:
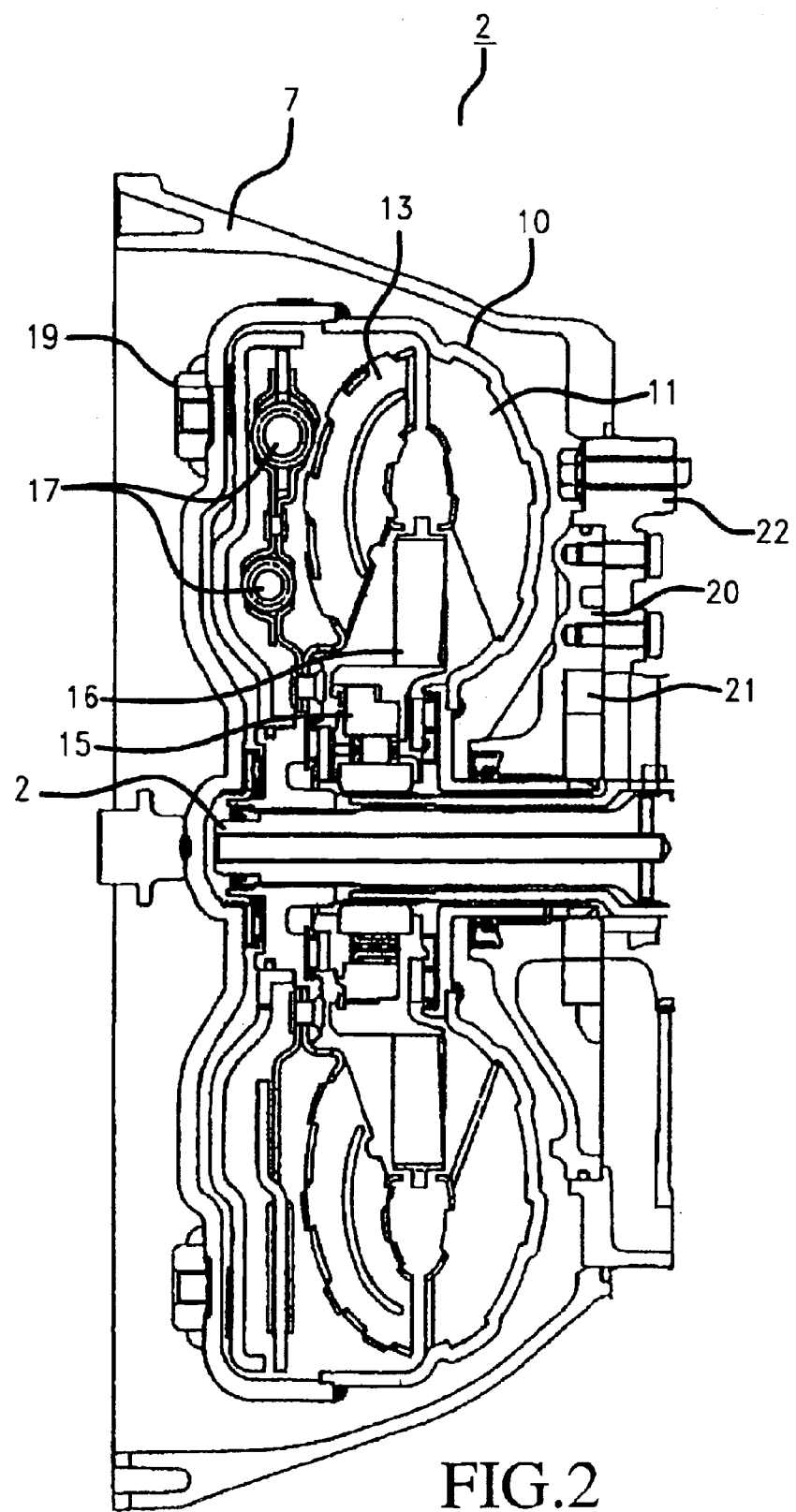
FIG. 2 is an expanded cross-section of a torque converter portion of the first embodiment.

The torque converter 2, as shown in FIG. 2, is provided with a pump impeller 11 fixed to a cover 10 that is connected to an engine output shaft (not shown), a turbine runner 13 that connects to an input shaft 12 of the multi-speed change mechanism 6, and a stator 16 that is supported via a one-way clutch 15. A lock-up clutch 19 mechanically connects, via a spring damper 17, the cover 10 and the input shaft 12. Also, a pump case 20 is fixed between the converter housing 7 and the transmission case 9 (refer to FIG. 1), and an oil pump 21 is provided in the pump case 20. Further, a pump cover 22 is fixed to the rear side (backside; right side in FIG. 2) of the pump case 20, and an inner race of the above mentioned one-way clutch 15 is fixed to the pump cover 22.

As shown in FIG. 1, for the multi-speed change mechanism 6, a front side or forward section (torque converter side) has a clutch assembly 23, and a back side or rear side section (output shaft side) has a gear assembly 24.

Three clutches, a first clutch C1, a second clutch C2, and a third clutch C3 and their oil pressure actuators (oil pressure servos) are collectively positioned in the clutch section 23. The second and third clutches C2 and C3 are positioned at the outer circumference of the transmission with the second clutch C2 on the axially forward side and the third clutch C3 on the axial back side. The second and the third clutches are axially aligned, with the back side of the second clutch and the front side of the third clutch opposing each other. The first clutch C1 is positioned radially inward of the second and third clutches C2 and C3. More specifically, the first clutch C1 is positioned radially inward of the third clutch C3 without axially overlapping the second clutch C2.

Clutch Section

Hereinafter, the clutch section 23 will be described in detail with reference to FIG. 3 (expanded view of the clutch section 23 in FIG. 1).

The first, second and third clutches C1, C2 and C3 are rotatably supported by a boss portion 22a of the pump cover 22, and rotation is transmitted to pump cover 22 from a sleeve 25 which is connected to the input shaft (input member) 12.

A flange portion 26a of a first clutch drum 26 of the first clutch C1 is fixed to the backside of the sleeve 25. A drum portion 26b extends axially from the outer periphery of the flange portion 26a toward the back side. An axially extending spline 26c is formed on the inner surface of the drum 26, and a plurality of drive plates (outer friction plates) 27 are engaged by the spline 26c. A plurality of driven disks 29, with which the drive plates 27 are interleaved and are engaged and disengaged, are engaged by axially extending spline 30a that is formed on the outer surface of a first, hub 30. The inner periphery of the first hub 30 is connected and fixed to an intermediate shaft 31.

The first oil pressure actuator (servo) that engages and disengages the first clutch C1 has a first piston 32 that is positioned on the back side of the flange portion 26a of the first clutch drum 26. The first piston 32 is movably supported in the axial direction by the first clutch drum 26 and a peripheral surface of the input shaft 12, and an oil-tight first oil pressure chamber 33 is formed between the first piston 32 and the flange portion 26a of the first clutch drum 26. A rear end portion 32a at the outer periphery of the first piston 32 is positioned to engage (press against) the front side of the first clutch C1. A first cancel plate 34 is fixed to the input shaft 12 and extends therefrom the backside of the first piston 32. A return spring 35 is compressed between a front surface of the first cancel plate 34 and a rear surface of the first piston 32 which define therebetween a first cancel chamber 36 that offsets (counters) oil pressure that is supplied to the first oil pressure chamber 33.

The first clutch C1 is engaged when a predetermined oil pressure is supplied to the first oil pressure chamber 33 with the input shaft 12 rotating, and the first piston 32 moves to the back side against the force of the return spring 35. The rotation of the output shaft 12 is transmitted at the same speed to the intermediate shaft 31.

Next, the second and third clutches C2 and C3 will be described in detail.

A flange portion 37a of a clutch drum 37 for the second and third clutches C2 and C3 is fixed, slightly ahead of axial center on the peripheral surface of the sleeve 25. A drum portion 37b extends axially toward the backside from the flange portion 37a. A spline 37c is formed on the inner surface of the drum portion 37b. On the front side of the spline 37c engages a plurality of drive plates (outer friction plates) 39 of the second clutch C2 and on the back side engages a plurality of drive plates (outer friction plates) 40 for the third clutch C3. In other words, the clutch drum 37 is axially extended to accommodate the drive plates 39 and 40 of the second and third clutches C2 and C3 in an axially aligned arrangement. A stopper plate that is not axially movable is attached to the spline 37c, slightly to the back side of the drive plate 39 which is the rear most (back side) among the plurality of drive plates 39, and slightly to the front side of the drive plate 40 that is the front most of the plurality of drive plates 40. Thus, the second and third clutches C2 and C3 can be independently operated.

A plurality of driven disks 41, with which the drive plates 39 of the second clutch C2 are engaged and disengaged, are engaged in an axially extending array on a spline 42a that is formed on the outer surface of a second hub 42. The inner side of the second hub 42 is connected and fixed to a second sleeve shaft 43 that is rotatably supported by the intermediate shaft 31.

A plurality of driven disks 44, with which the drive plates 40 of the third clutch C3 are engaged and disengaged, is engaged in an axial array with a spline 45a that is formed on the outer surface of a third hub 45. The inner side of the third hub 45 is connected and fixed to a third sleeve shaft 46 that is rotatably supported by the second sleeve shaft 43.

The second oil pressure actuator that engages and disengages the second clutch C2 has a second piston 47 that is positioned on the backside of the flange portion 37a of the clutch drum 37. The second piston 47 is supported for axial movement by the clutch drum 37 and the outer peripheral surface of the sleeve 25, and an oil-tight second oil pressure chamber 49 is formed between the second piston 47 and the clutch drum 37. A rear edge portion 47a on the outer side of the second piston 47 extends axially to oppose the front surface of the second clutch C2. A second cancel plate 50 whose inner periphery is fixed to the outer peripheral surface of the sleeve 25 is provided on the back side of the second piston 47. A return spring 51 is compressed between the front surface of the second cancel plate 50 and the back surface of the second piston 47 which define a second cancel chamber 52 therebetween that offsets the centrifugal oil pressure that is supplied to the second oil pressure chamber.

The third oil pressure actuator that engages and disengages the third clutch is provided with a third piston 53 that has a flange portion 53a that is positioned on the front side of the flange portion 37a of the clutch drum 37. Further, the third piston 53 has a drum portion 53b that extends toward the backside from the outer periphery of the flange portion 53a along the external side of the clutch drum 37. Splines 53c, engaged with the splines (not shown) formed on the outer peripheral surface of the drum portion 37b, are formed on the interior surface of the drum portion 53b, and a portion 53d on the back side is positioned so as to oppose (correspond to) the back side of the third clutch C3. A third cancel plate 54 whose inner periphery is fixed to the front side of the outer peripheral surface of the sleeve 25 is provided on the front side of the flange portion 53a of the third piston 53. The third piston 53 is movably supported by the clutch drum 37, the third cancel plate 54 and the outer peripheral surface of the sleeve 25. An oil-tight third oil chamber 55 is formed between the backside of the flange portion 53a of the third piston 53 and the front side of the flange portion 37a of the clutch drum 37. Further, a return spring 56 is compressed between the front side of the flange portion 53a of the third piston 53 and the third cancel plate 54 which forms a third cancel chamber 57 that offsets the centrifugal oil pressure that is supplied to the third oil pressure chamber 55.

Because the second and third clutches C2 and C3 are axially aligned so that the back side of the second clutch and the front side of the third clutch are opposed, because the first clutch is positioned radially inward of the second and third clutches C2 and C3, and further because a portion of the second and third clutches C2 and C3 is used in common, the entire clutch portion 23 can be compactly structured.

More specifically, the first clutch C1 is positioned so that it axially overlaps the third clutch and is radially inward of same. Also, the third hub 45 is positioned radially inward of the third clutch C3, the second hub 42 is positioned radially inward of the third hub 45, and the first clutch C1 is positioned radially inward of the second hub 42. In other words, these members are positioned so that they axially overlap and are radially arranged in the order of the third clutch C3, the third hub 45, the second hub 42 and the first clutch C1 from the outer side toward the center.

Moreover, by engaging and disengaging the second clutch C2 from the axial front side with the second piston 47 of the second oil pressure actuator, and by engaging and disengaging the third clutch C3 from the axial rear (back) side by the third piston 53 of the third oil pressure actuator, the first, second and third clutches C1, C2 and C3 can each be independently engaged and disengaged by the first, second and third oil pressure actuators, respectively. In other words, when a predetermined oil pressure is supplied to the first oil pressure chamber 33 with the input shaft 12 rotating, the first piston 32 overcomes the force of the return spring 35 and moves toward the back side, and the first clutch C1 is engaged. Due to the engagement of the first clutch C1, the rotation of the output shaft 12 is transmitted to the intermediate shaft 31 via the first clutch drum 26, the first hub 30, etc. In the same way, when a predetermined oil pressure is supplied to the second oil pressure chamber 49 with the input shaft 12 rotating, the second piston 47 overcomes the force of the return spring 51 and moves toward the back side, and the second clutch C2 is thereby engaged from the front side. Due to the engagement of the second clutch C2, the rotation of the output shaft 12 is transmitted to the second sleeve shaft 43 via the clutch drum 37, the second hub 42, etc. Further, in the same way, when a predetermined oil pressure is supplied to the third oil pressure chamber 55 with the input shaft 12 rotating, the third piston 53 overcomes the force of the return spring 56 and moves toward the front side, and the third clutch C3 is thereby engaged from the back side. Due to the engagement of the third clutch, the rotation of the output shaft 12 is transmitted to the third sleeve shaft 46 via the clutch drum 37, the third hub 45, etc.

In the above-described manner, the first, second and third clutches C1, C2 and C3 can each be independently operated (engaged and disengaged) by the first, second and third oil pressure actuators. Further, by doing so, as described later, it is possible for automatic transmission 1 according to the invention to have six forward shift speeds.

Gear Section

As shown in FIG. 1, gear section 24 is provided on the rear (back) side of the multi-speed change mechanism 6, and three planetary gear units (the first planetary gear unit 3, the second planetary gear unit 4 and the third planetary gear unit 5 are closely ("collectively") positioned along with their holding units (first through fourth holding units). Further, in the embodiment of the invention illustrated in FIG. 1, the first holding unit is made up of a first brake B1 and a first one-way clutch F1; the second holding unit is a second brake B2; the third holding unit includes a third brake B3 and a second one-way clutch F2; and the fourth holding unit includes a fourth brake B4 and a third one-way clutch F3.

Figure 4:
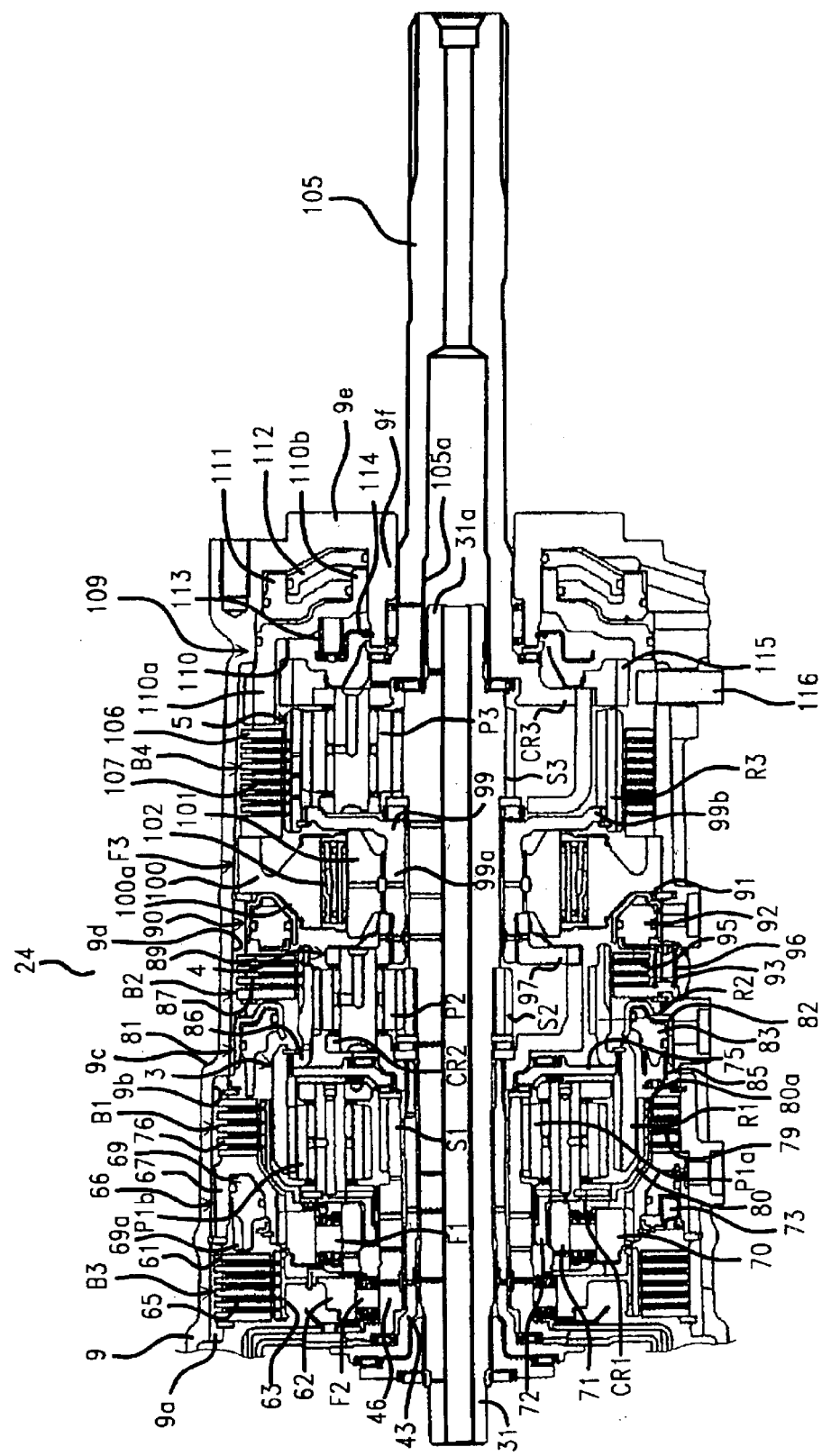
FIG. 4 is an expanded cross-section of a gear assembly that is a rear section of the multi-speed change mechanism of the first embodiment.
Figure 5:
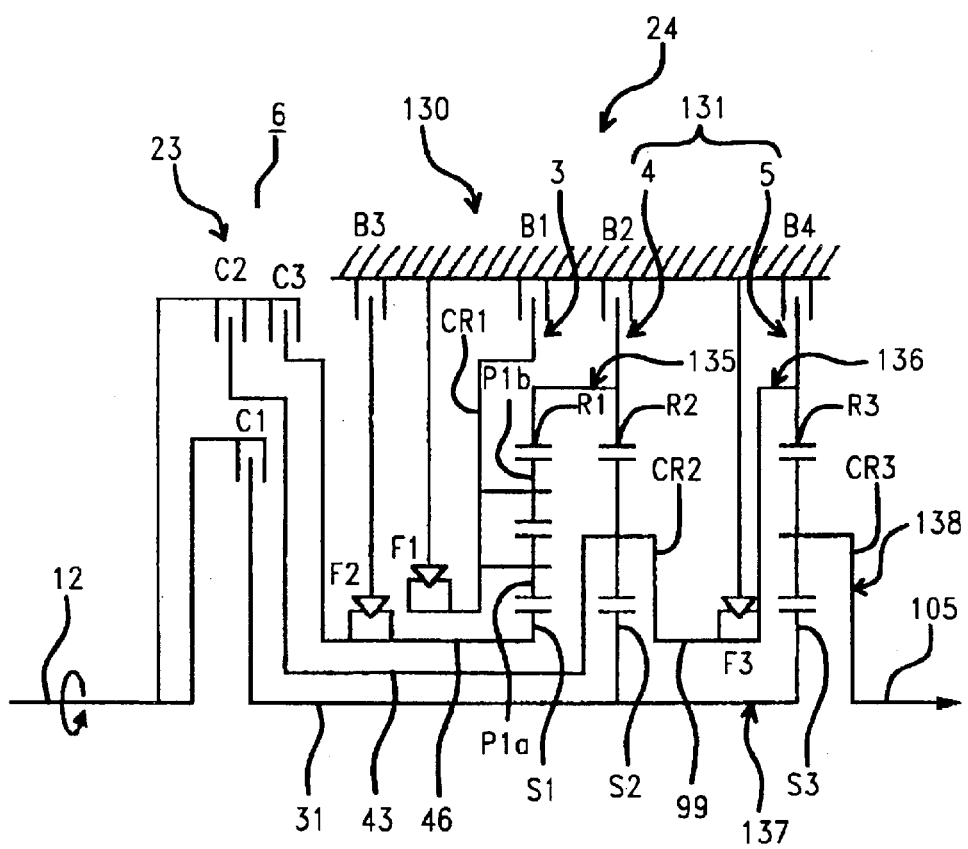
FIG. 5 is a skeletal diagram of the multi-speed change mechanism of the first embodiment.

As shown in FIG. 4, the gear section 24 includes, in order from the front side (the input member 12 side), the first planetary gear unit 3 that has a sun gear S1 formed on the third sleeve shaft 46, the second planetary gear unit 4 that has a carrier CR2 connected to the second sleeve shaft 43, and the third planetary gear unit 5 that has a sun gear S3 formed on the intermediate shaft 31. Further, the third brake B3, the first one-way clutch F1 and the second one-way clutch F2 are positioned axially between the clutch section 23 and the first planetary gear unit 3, and the third one-way clutch F3 is positioned axially between the second planetary gear unit 4 and the third planetary gear unit 5.

The third brake B3 is a multi-plate brake, and includes a plurality of outer brake plates 61 engaged on spline 9a formed on the transmission case 9, and brake discs 65 splined to the hub 63 that is fixed to an outer race 62 of the second one-way clutch F2. The inner race of the second one-way clutch F2 is formed by the third sleeve 46 itself, and the third brake B3 and the second one-way clutch F2 axially overlap in their radially spaced positions.

An oil pressure actuator 66 for the third brake is provided on the axial rear side of the third brake B3, and the oil pressure actuator 66 is made up of a cylinder member 67 that is connected to the transmission case 9 such that the cylinder member 67 cannot axially move, and a piston 69 that is fitted in cylinder member 67 in an oil-tight manner, with a forward edge portion 69a facing the third brake B3. Further, an outer race 70 of the first one-way clutch F1 is spline-engaged with the inner surface of the cylinder member 67, and an inner race 71 of the first one-way clutch F1 is spline-engaged with a boss portion 72 of the carrier CR1 of the first planetary gear unit 3. The oil pressure actuator 66 for the third brake B3 and the first one-way clutch F1 are positioned so that they (or at least portions thereof) respectively axially overlap in radially different positions. Further, the end portion of the piston 69 is formed in a comblike shape, and a return spring 73 is held in position by the comb teeth. Further, the second one-way clutch F2 and the first one-way clutch F1 are axially aligned, and the third brake B3 and its oil pressure actuator 66 are on the radially outward side, and are positioned to axially overlap the first and second one-way clutches F1 and F2.

The first planetary gear unit 3 is a dual planetary gear that has a pinion P1a that meshes with the sun gear S1 and a pinion P1b that meshes with a ring gear R1 (refer to FIG. 5), and a carrier CR1 that supports the pinions P1a and P1b that mutually mesh is rotatably supported on the third sleeve shaft 46 by the boss portion 72, and the sun gear S1 is integrally formed with the third sleeve shaft 46. Further, the ring gear R1 is rotatably supported by a plate 75 that is spline-engaged at the rear edge of ring gear R1 to, limit its axial movement. R1 is also spline-engaged with a ring gear R2 of the second planetary gear unit 4.

The first brake B1 is a multi-plate brake, and includes a plurality of outer brake plates 76 engaged with a spline 9b (formed continuous with spline 9a) formed on the transmission case 9, and inner brake discs 79 engaged with the spline that is formed on the outer peripheral surface of a cup-shaped member 80 that constitutes the carrier CR1. The cup-shaped member 80 has an outer side flat surface 80a which extends so as to cover the side of the first planetary gear unit 3. The spline that engages the inner brake discs 79 of the first brake B1 is formed on the outer side of flat surface 80a and is positioned so that the first brake B1 and the first planetary gear unit 3 axially overlap, with the first brake B1 located radially outward of the first planetary gear unit 3. More accurately, the first brake B1 is within the axial length of the third planetary gear unit 3.

An oil pressure actuator 81 for the first brake is provided on the rear side of the first brake B1. The oil pressure actuator 81 has a cylinder 82, that is fixed to a small diameter step formed in the transmission case 9, and a piston member 83 that is fitted in cylinder 82 in an oil tight manner. The oil pressure actuator 81 is positioned axially straddling and radially outward of the first and second planetary gear units 3 and 4. In other words, the first brake B1 that holds a specified rotational element (CR1) of the first planetary gear unit 3 and the oil pressure actuator 81 are positioned on the outer side of the first planetary gear unit 3, with at least a portion thereof axially overlapping the first planetary gear unit 3. Further, the piston member 83 has a comblike portion facing the first brake B1, and a return spring 85 is held between the comb teeth.

The second planetary gear unit 4 is a simple planetary gear unit, and includes a carrier CR2 that supports a pinion P2 and is spline-engaged with the second sleeve shaft 43. Also, a sun gear S2 is splined with the intermediate shaft 31, and the ring gear R2 is splined with the ring gear R1 of the first planetary gear 3. The second planetary gear unit 4 has a smaller diameter than that of the first planetary gear unit 3, the latter being a dual planetary gear unit. Consequently, a collar portion 86 extends radially outward to the front edge of the ring gear R2 and the an outer periphery of the collar 86 is splined to the inner peripheral surface of the ring gear R1. The oil pressure actuator 81 for the first brake, excluding the extended portion of the piston, is positioned on the outer side of the second planetary gear unit 4, along with the second brake B2. Consequently, the oil pressure actuator 81, despite the fact that the transmission case 6 has a small diameter due to a stepped diameter portion 9c, has a specified pressure receiving surface area, and has a torque volume that corresponds to the torque capacity necessary for the first brake B1.

The second brake B2 is positioned on the rear side of the oil pressure actuator 81 for the first brake. The second brake B2 is a multi-plate brake, and includes a plurality of outer brake plates 87 engaged by a spline 9d inside the transmission case 9 and inner brake discs 89 engaged with a spline that is formed on the outer peripheral surface of the ring gear R2. The second brake B2 is positioned so as to axially overlap the second planetary gear unit 4 and radially outward of the second planetary gear unit 4. More accurately, the second brake B2 is within the axial length of the second planetary gear unit 4.

An oil pressure actuator 90 for the second brake is provided on the rear side of the second brake B2. The actuator 90 has a cylinder member 91, that is fixed to and positioned on the inner peripheral surface of the transmission case 9, and a piston member 92 that is fitted within cylinder member 91 in an oil-tight manner. While the other piston members 69 and 83 that extend toward the brake have extended portions that hold the return springs 73 and 85 between comb teeth, the piston member 92 has a shorter structure without such an extended portion. The oil pressure actuator 90 is positioned so that a portion thereof overlaps a rear edge portion of the second planetary gear unit 4 on the rear side of the second brake B2, or the front edge portion of the piston member 92 and the second planetary gear unit 4 are axially aligned. The brake plate 87 and the inner brake disks 89 of the second brake B2 are notched on their outer peripheries at specified intervals, and a return spring 96 is compressed between a support plate 95, that depends from the front edge of a skirt portion of the piston member 92, and a notched portion 93 on a fixed member such as the transmission case.

The third one-way clutch F3 is provided on the rear side of the oil pressure actuator 90 for the second brake B2, in other words, between the second planetary gear unit 4 and the third planetary gear unit 5. A rear carrier plate 97 of the second planetary gear unit 4 and a ring gear R3 of the third planetary gear unit 5 are connected via a connection member 99. The third one-way clutch F3 has an outer race 100 that is the fixed side and an inner race 101 that is the movable side, the outer peripheral surface of the outer race 100 is spline-engaged with the transmission case 9, and the inner peripheral surface of the inner race 101 is spline-engaged with the boss 99a on the connection member 99.

The outer race 100 described above is widened where it engages an engagement member 102, such as a roller or a sprag, according to the width of the engagement member. In addition, the outer race 100 is gradually narrowed both axially front to rear and radially butward, and extends in the shape of a collar only at its radially outer end on the rear side. Consequently, the outer race 100 has a contact surface that matches the engagement member 102 which is relatively axially long, and a specified length of the transmission case is taken by the aforementioned collar shaped extended portion to provide the required torque capacity. The front side of outer race 100 includes a concave portion 100a, and the rear portion of the actuator 90 for the second brake is received in the concave portion 100a, making it possible to position the second brake, including its actuator 90, on the outer (radially outward) side of the second planetary gear unit 4 (so that at least a portion thereof axially overlaps the second planetary gear unit 4). This contributes to the shortening of the overall axial length of the automatic transmission 1. In other words, the oil pressure actuator 90 is positioned, between the second planetary gear unit 4 and the third one-way clutch F3.

The inner race 101 described above broadens where it engages the engagement member 102 in accordance with the width of the engagement member, and narrows gradually radially inward. As described above, while securing the torque capacity attributable to the contact area, the space for spline connection of the connection member 99 and the rear carrier plate 97 is allowed for.

The third planetary gear unit 5 is provided on the rear side of the third one-way clutch F3. The third planetary gear unit 5 is a simple planetary gear unit, and its ring gear R3 is engaged with the outer peripheral surface of a flange 99b of a connection member 99 and connects with the carrier CR2. The sun gear S3 is integrally formed on a rear portion of the intermediate shaft 31, and a carrier CR3 that supports a pinion P3 is integrally formed with an output shaft 105. The intermediate shaft 31 has a stepped structure in which the diameter sequentially decreases toward the front, with the sun gear S3 portion as the largest diameter. The carrier CR3 is formed as a flange at the front end of the output shaft 105. A rear end projection 31a of the intermediate shaft 31 is fitted into a front end hollow portion 105a of the output shaft 105 and the output shaft 105 is rotatably supported so that it cannot axially move. Further, the front end of the intermediate shaft 31 is fitted to the input shaft 12 (refer to FIG. 3) and is thereby rotatably supported, and both ends thereof are indirectly supported by the transmission case 9 via the input shaft 12 and the output shaft 105. Also, the front end of the output shaft 105, is directly supported by a collar portion 9f at the rear end 9e of the transmission case 9 via a bearing, and the rear end of output shaft 105 is directly supported by an extension case (fixed to the rear end of the transmission case 9, not shown) via a bearing.

The fourth brake B4 is provided on the rear side of the third one-way clutch F3. The fourth brake B4 is a multi-plate brake, and includes a plurality of external brake plates 106 is engaged with a spline 9d formed on the inner surface of the transmission case 9 along with the outer race 100 of the third one-way clutch F3. Further, the axial movement of the forth brake B4 is limited by a snap ring (not shown), and inner brake disks 107 are engaged with a spline that is formed on the outer peripheral surface of the ring gear R3. The fourth brake B4 is positioned so that the forth brake B4 and the third planetary gear unit 5 axially overlap (or at least portions thereof overlap) on the outer side of the third planetary gear unit 5.

The oil pressure actuator 109 for the fourth brake is located on the rear side on the fourth brake B4 and the third planetary gear unit 5. An oil pressure actuator 109 is a double piston type with its cylinder formed in the case 9, i.e., the inner peripheral surface of the rear portion of case 9, the rear end 9e of case 9 and the collar portion 9f of case 9. Actuator 109 also has a first piston member 110, an intermediate support member 111 and a second piston member 112. The first piston member 110 is mounted within the cylinder in an oil-tight manner and has an extension 110a that protrudes forward from its outer periphery, and a hub 110b that protrudes backward from its inner periphery. The extension 110a is engaged with the inner spline 9d and opposes the fourth brake B4.

The inner periphery of the intermediate support member 111 slides on and seals with hub portion 110b, and its outer periphery seals with the aforementioned cylinder formed in the transmission case 9. The outer periphery of the second piston member 112 slides and seals on the inner surface of a skirt extending from the outer periphery of support member 111 and its inner periphery slides and seals on case portion 9e and contacts the hub portion 110b of the first piston member 110. A return spring 113 is compressed between the first piston member 110 and a support plate 114 that is provided on the collar portion 9f of the transmission case 9.

Consequently, the oil pressure actuator 109 for the fourth brake has a large pressure-receiving surface area and is formed in part by the rear end surface of the transmission case 9. Because of the double piston structure that is made up of the first and second piston members 110 and 112, an even larger pressure-receiving surface area is obtained, and a large force that corresponds to the set torque capacity of the fourth brake B4 is obtained.

A parking gear 115 is integrally provided on the radial outer side of the carrier CR3, and engagement of the parking gear 115 by a parking shaft 116, that extends through the transmission case, fixes the output shaft 105. Also, the first piston member 110 of the oil pressure actuator 109 for the fourth brake receives the parking gear 115 and has a notch through which the parking shaft 116 extends, and is positioned on the rear side so as to slightly axially overlap the third planetary gear unit 5 on the radially outward side of the third planetary gear unit 5.

Next, the operation of the multi-speed change mechanism 6, having the structure described above will be described with reference to FIGS. 5–7.

The multi-speed change mechanism 6 is divided by function into a front gear set 130 that is made up of the first planetary gear unit 3, and a rear gear set 131 that is made up of the second planetary gear unit 4 and the third planetary gear unit 5. The rear gear set 131 has a total of four rotational elements, a first rotational element 137 that is made up of both the sun gears S2 and S3 that are connected via the intermediate shaft 31, a second rotational element 136 that is made up of the carrier CR2 and the ring gear R3 that are connected via a connection member 99, a third rotational element 135 that is made up of ring gears R1 and R2 that are connected, and a fourth (output) rotational element 138 that is made up of the carrier CR3 that is connected to the output shaft 105.

The first rotational element 137 is connected via the intermediate shaft 31 to the first clutch C1 that is positioned on the radial inner side of the clutch section 23. The second rotational element 136 is connected via the second sleeve shaft 43 to the second clutch C2 that is positioned at the forward side and on the outer radial side of the clutch section 23. The sun gear S1 that is the input element of the first planetary gear unit 3 is connected via the third sleeve shaft 46 to the third clutch C3 that is positioned at the rear side and on the radially outer side of the clutch section 23.

Figure 7:
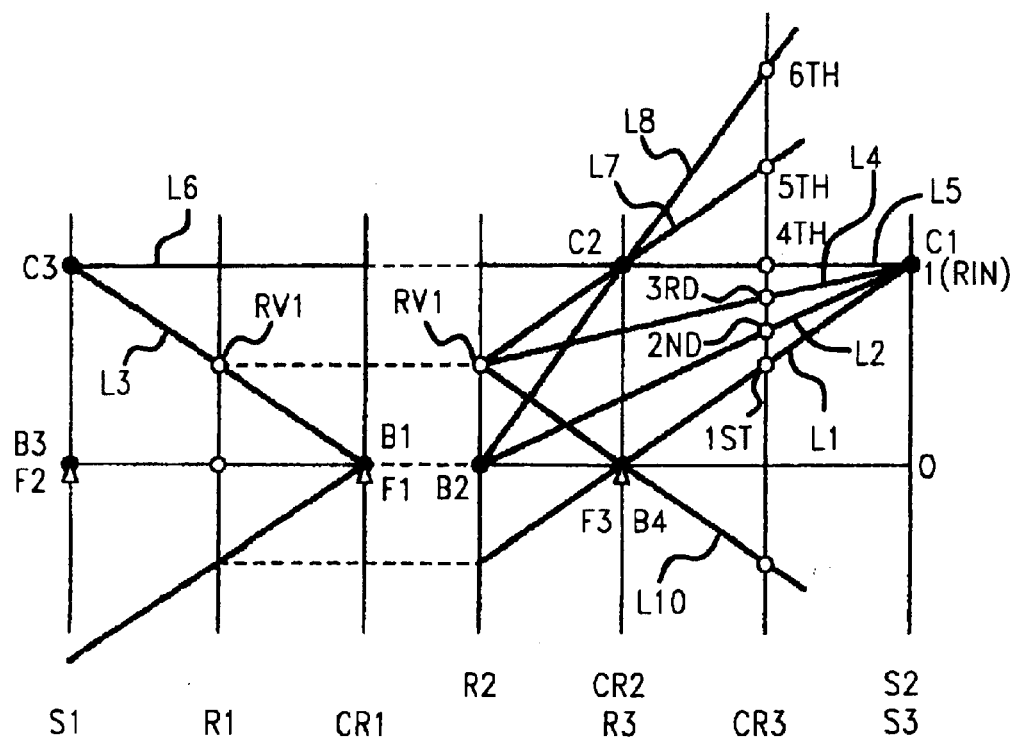
FIG. 7 is a speed diagram of the multi-speed change mechanism of the first embodiment.

In the first forward speed (first speed: 1st), as shown in FIG. 6, while the first clutch C1 is engaged, the third one-way clutch F3 is operated, and the input shaft 12 and the sun gears S2 and S3 (the first rotational element 137) are connected. The reverse rotation of the carrier CR2 and the ring gear R3 (the second rotational element 136) is stopped by the third one-way clutch F3, and the rotation (RIN) of the input shaft 12 is directly input to the sun gear S3 of the third planetary gear unit 5 via the first clutch C1. Then, due to the braking of the ring gear R3 (stopped) by the third one-way clutch F3, the state shown as L1 in the speed diagram in FIG. 7 is established, and a clockwise first speed is produced from the carrier CR3 (the output rotational element 138) to which the output shaft 105 is connected. Further, the sun gear S2 rotates, but the second planetary gear unit 4 idles.

In the above-described L1 state the first speed and large torque is supported by the third one-way clutch F3, which, as shown in FIG. 4, is positioned in the relatively long space between the second and third planetary gear units 4 and 5, given the large engaging surface areas of the holding member (roller or sprag) 102, of the outer race 100 and of the inner race 101. Therefore, a large torque is reliably transmitted. Also, in this state the first clutch C1 is independently operated by the first oil pressure actuator on the radial inner side of the clutch section 23.

In the second-forward speed (second speed: 2nd), as shown in FIG. 6, in addition to the engagement of the first clutch C1 (engaged during the first speed), the third brake B3 is engaged, and the operation of the third one-way clutch F3 is canceled, and the first and second one-way clutches F1 and F2 are operated. In this state, the first planetary gear unit 3 is stopped because its carrier CR1 is stopped by the first one-way clutch F1 that is in a locked state, and because the sun gear S1 is stopped due to locking of the second one-way clutch F2 by engagement of the third brake B3. Consequently the ring gear R2 of the second planetary gear unit 4 that is connected to the ring gear R1 is stopped.

The rotation of the input shaft 12 is input to the second planetary gear unit 4 from the sun gear S2 via the first clutch C1, and is input to the third planetary gear unit 5 via the sun gear S3. The rotation of the ring gear R2, as described before, is stopped (the speed is zero), the state indicated as L2 in the speed diagram of FIG. 7 is established, and clockwise second speed rotation is output from the carrier CR3 that is connected to the output shaft 105.

In state L2 described above, the rotational torque of the ring gear R2 is divided and supported by the third brake B3 via the first and second one-way clutches F1 and F2. Because the torque capacity of the first one-way clutch F1 is used, the torque load capacities and sizes of the second one-way clutch F2 and the third brake B3 can be reduced. Thus, it is possible to collectively position the third brake B3 and the oil pressure actuator 66, as well as the first and second one-way clutches F1 and F2, in a compact manner on the forward portion of the first planetary gear unit 3.

In the third forward speed (third speed: 3RD), as shown in FIG. 6, in addition to the engagement of the first clutch C1 (engaged during the first and second speeds), the third clutch is engaged, the operation of the second one-way clutch F2 is canceled, and. the operation of the first one-way clutch F1 is maintained. In this state, the rotation of the input shaft 12, which has been input to the rear gear set 131 via the first clutch C1, is additionally input to the sun gear S1 of the front gear unit 130 via the third clutch C3, while the carrier CR1 is held by the first one-way clutch F1.

Then, because the rotation of the input shaft 12 is input to the sun gear S1 and the carrier CR1 is held, the first planetary gear unit 3 is brought into the state shown as L3 in the speed diagram in FIG. 7, and clockwise rotation RV1 is output from the ring gear R1, serving as the output element of the front gear set 130, to the ring gear R2 of the second planetary gear unit 4, serving as the input element of the rear gear unit 131. Meanwhile, in the rear gear set 131, because the rotation RIN of the input shaft 2 is input to the sun gears S2 and S3, the rotation RV1 that is input to the ring gear R2, as shown by L4 in FIG. 7, is synthesized and third speed rotation is produced from the carrier CR3 that is connected to the output shaft 105. Further, the third brake B3 is engaged, but since the second one-way clutch F2 is idling, the third brake B3 is not involved in the shifting.

In the above-described L3 state, the first one-way clutch F1 supports the reaction force of the torque that is transmitted to the first planetary gear unit 3; however, in the third speed state, because the torque that goes through the first planetary gear unit 3, that serves as is the front gear unit 130, and the torque that is directly transmitted via the first clutch C1 to the rear gear unit 131 are synthesized, a portion of all the transmitted torque is sufficient for the reaction force torque that is borne by the first one-way clutch F1. Consequently, as the first one-way clutch F1, a compact one-way clutch with a small torque capacity is sufficient, and it is possible to collectively position the other holding units, the third brake B3 and the second one-way clutch F2 in a relatively small space ahead of the first planetary gear unit 3.

Also, the third clutch C3 is engaged by supply of oil pressure to the third oil pressure actuator which causes the third piston 53 to move axially forward, and the extension 53d of the back side of the third piston 53 presses the drive plates 40 and the driven disks 41 of the third clutch C3 from the back side toward the front side. As described before, the second clutch C2 shares the clutch drum 37 with the third clutch C3, and all of the drive plates 39 and 40 are axially aligned with and engaged by the spline 37a on the inner surface of the clutch drum 37. However, because the second piston 47 and the third piston 53 are operated independently, the operation of the third clutch C3 does not affect the second clutch C2.

In the fourth forward speed (fourth speed: 4TH), as shown in FIG. 6, in addition to the engagement of the first clutch C1 (engaged during the first, second and third speeds) and the engagement of the third clutch C3 (engaged during the third speed), the second clutch C2 is engaged, and the operation of the first one-way clutch F1 is canceled. In this state, the rotation of the input shaft 12, which has been input to the sun gears S2 and S3 of the rear gear unit 131 via the first clutch C1, is additionally input to the carrier CR2 and the ring gear R3 via the second clutch C2. Then, the rear gear set 131, in other words both of the second and third planetary gear units 4 and 5, directly rotates, the state indicated as L5 in FIG. 7 is established, and the fourth speed rotation is output from the carrier CR3 that is connected to the output shaft 105.

In the above-described L5 state, the third clutch C3 and the third brake B3, as shown in FIG. 6, are engaged. However, because the rotation of the input shaft 12 is transmitted to the sun gear S1 via the second clutch C2 and the second planetary gear 4 unit is directly connected to the input shaft 12 and rotates clockwise, the rotation of the input shaft 12 is also input to the ring gear R1 that is connected to the ring gear R2 to establish the state shown as L6 in FIG. 7, and the entire first planetary gear unit 3 (front gear set 130) idles in a state of direct connection. Also, in the fourth speed state, the front gear set 130 and the rear gear set 131 are both directly connected, and the first through fourth holding units, in other words, the first through fourth brakes B1 through B4 and the first through third one-way clutches F1 through F3, do not operate and the reaction force is not supported.

Also, the second clutch C2 is connected by supply of oil pressure to the second oil pressure actuator which causes the second piston 47 to move axially forward so that its skirt portion 47a presses against the drive plates 39 and the driven disks 41. The third clutch C3 is maintained in the engaged state because the operation of the second clutch C2 does not affect the engagement state of the third clutch C3.

In the fifth forward speed (fifth speed: 5TH), as shown in FIG. 6, the first clutch C1 is disengaged, while the engagement of the second and third clutches C2 and C3 is maintained, and the first brake B1 is engaged. In this state, the rotation of the input shaft 12 is input via the second clutch C2 to the carrier CR2 of the second planetary gear unit 4 (rear gear set 131) and the ring gear R3 of the third planetary gear unit 5, and is input via the third clutch C3 to the sun gear S1 of the first planetary gear unit 3. Then, because the carrier CR1 is held by the first brake B1, the front gear set 130 is brought into the state shown as L3 in FIG. 7, and the decelerated clockwise rotation RV1 is output to the ring gear R2 of the rear gear set 131 from the ring gear R1. As described before, because the rotation of the input shaft 12 is input to the carrier CR2 and the ring gear R3 of the rear gear unit 131, a state shown as L7 in FIG. 7 is established, and fifth speed rotation is output to the output shaft 105 from the carrier CR3. At this time, the third brake B3, as shown in FIG. 6, is engaged. However, because the second one-way clutch F2 is idling, the third brake B3 is not involved in the shifting.

In fifth speed, the first brake B1 bears the reaction force of the transmitted torque. However, because the fifth speed is a high-speed state, a small torque capacity is sufficient. Further, because the torque from the path that goes through the second clutch C2 and from the path that goes through the third clutch C3 is synthesized by the ring gear unit 131 and transmitted to the output shaft 105, a portion of the overall transmitted torque is sufficient for the torque capacity of the first brake B1 that brakes the carrier CR1 and the ring gear R1. Further, even a small torque capacity is sufficient. Consequently, the first brake B1 can be relatively axially short and can be located on the outer side of the first planetary gear unit 3, and the oil pressure actuator 81 can also be provided in a space which is relatively axially short and small, and which straddles the adjacent first and second planetary gear units 3 and 4 on their outer side. Thus, it is possible to provide the third brake B3 and the oil pressure actuator 81 in a relatively small space on the radially outer side of the first planetary gear unit 3.

In the first clutch C1, because the first piston 32 is urged forward in the axial direction by the return spring 35, the pressure of the drive plate 27 and the driven disk 29 is canceled by release of oil pressure from the first oil pressure chamber 33 of the first oil pressure actuator. During release, the first clutch drum 26 rotates at a relatively high speed and therefore centrifugal force acts on the oil in the first cancel chamber 36, and the oil pressure in the first oil pressure chamber 33 is quickly discharged.

In sixth speed (6TH), as shown in FIG. 6, the third clutch C3 is released, the engagement of the second clutch C2 is maintained, and the second brake B2 is engaged. In this state, the rotation of the input shaft 12 is input to the carrier CR2 of the second planetary gear unit 4 that serves as the rear gear set 131 and to the ring gear R3 of the third planetary gear unit 5 via the second clutch C2. Meanwhile, because the ring gear R2 is held by the second brake B2, the sun gears S2 and S3 rotate clockwise at a speed higher than in fifth speed due to the rotation of the carrier CR2. Sixth speed rotation that is faster than fifth speed is transmitted to the output shaft 105 from the carrier CR3 by the rotation of the ring gear R3 and the high speed rotation of the sun gear S3. The sixth speed corresponds to L8 of the speed diagram in FIG. 7. In sixth speed, the first and third brakes B1 and B3 are engaged as shown in FIG. 6. However, because the first and second one-way clutches F1 and F2 are idling, the first and third brakes B1 and B3 are not involved in the shifting. Also, although the third clutch C3 is disengaged, the oil pressure in the third oil pressure chamber is quickly released due to the centrifugal force that acts on the oil in the third cancel chamber 57.

Also, when in the sixth speed, the second brake B2 bears the reaction force of the transmitted torque. However, because the sixth speed is a high-speed state that is higher than the fifth speed, even a small torque capacity is sufficient. Consequently, as in the case of the first brake B1, the second brake B2 can be relatively axially short and located on the outer side of the second planetary gear unit 4, and the oil pressure actuator 90 can also be provided in a space which is relatively axially short and small, on the front side of the third one-way clutch F3.

As clearly shown in FIG. 6, the shifting from the first through the fourth speeds is carried out by the one-way clutch, and the shifting from the fourth speed to the fifth speed and the shifting from the fifth speed to the sixth speed is carried out by clutch to brake shifting.

In downshifting, the second clutch C2 or the third clutch C3 is operated, as. shown in FIG. 6, i.e., when downshifting from the sixth speed to the fifth speed, from the fourth speed to the third speed, and from the third speed to the second speed.

In all shifts, the second and third pistons 47 and 53 of the second and third oil pressure actuators are each independently operated, and because their drive plates 39 and, 40 and driven disks 41 and 44 can be independently engaged and disengaged, the operation of one of the clutches does not affect the operation-or engaged state of the other clutch.

In reverse (reverse speed: REV), as shown in FIG. 6, the third clutch C3 is engaged, and the fourth brake and the first one-way clutch F1 are engaged. In this state, because the rotation of the input shaft 12 is input to the sun gear S1 of the front gear set 130 via the third clutch C3, and because the carrier CR1 is held by the first one-way clutch F1, the state shown as L3 in FIG. 7 is established, and the clockwise output rotation RV1 is transmitted to the ring gear R2 of the rear-gear set 131 from the ring gear R1. Because the ring gear R3 and the carrier CR2 are held by the fourth brake B4, the rear gear unit 131 is brought into state L10 in FIG. 7, and reverse rotation is transmitted to the output shaft 3 from the carrier CR3.

In reverse a large torque that has been decelerated acts on the fourth brake B4 that holds the ring gear R3 and the carrier CR2. The fourth brake B4 is made relatively axially long and overlaps the third planetary gear unit 5 on the outer side of the third planetary gear unit 5 and, because its oil pressure actuator 109 includes a relatively wide pressure receiving surface area on the rear end 9e of the transmission case 9 and has a double piston structure, a large force can be applied, making it possible to reliably support the torque corresponding to the large reaction force.

During engine braking (coasting), as shown in FIG. 6, when in third speed and in reverse, the first brake B1 is engaged, and the carrier CR1 is reliably held, while the first one-way clutch F1 idles. When in second speed the second brake B2 is engaged, and the ring gear R2 is reliably held. Further, when in first speed, the fourth brake B4 is engaged and the ring gear R3 is reliably held.

Further, during engine braking in second speed, in addition to the second brake B2 which is primarily used for engine braking, the first brake B1 is engaged, the ring gear R2 is held by the first brake B1 via the carrier CR1, and thus the torque capacity required of the second brake B2 is made small, making it possible to make the second brake B2 smaller. The second brake B2 is for use in engine braking when in second speed. The torque capacity of the second brake B2 can be small, and a relatively small space in the outer portion of the second planetary gear unit 4 is sufficient to accommodate brake B2. Further, as described above, at the time of engine braking of the second speed, if the first brake B1 is operated, the torque capacity of the second brake B2 can be smaller. The second brake B2 can be positioned along with its oil pressure actuator 90 in a small space, and can effect braking with certainty and high reliability.

As described above, when the torque from the input shaft 12 is input to the second planetary gear unit 4, the input torque from the sun gears S2 and S3 when in the second speed, from the sun gears S1, S2 and S3 when in the third speed, from the sun gears S2 and S3 when in the fourth speed, from the sun gears S1 and S2 and the ring gear R3 when in the fifth speed, and from the sun gears S2 and S3 and the ring gear R3 when in the sixth speed, is transmitted to the front gear set 130 and to the rear gear set 131. Consequently, the input torque is not input solely to the second planetary gear unit 4, and thus the second planetary gear unit 4 is made smaller in order to achieve the appropriate gear ratio. In addition, it is possible to make it smaller due to the lower strength required because of the distribution of the torque input. Although the oil actuator 81 is positioned on the outer side of the second planetary gear unit 4, and the second planetary gear unit 4 has a torque capacity that supports the torque required for the first brake B1, it is possible to make the transmission more compact in both its axial and radial dimensions.

Also, with regard to the first, second and third clutches C1, C2 and C3 that transmit the input torque to the first, second and third planetary gear units 3, 4 and 5, in order to sufficiently maintain the torque capacity it is desirable to increase the radial dimensions. However, because clutch section 23 is positioned on the torque converter 2 side of the multi-speed change mechanism, the clutches can be structured so that their respective radial dimensions decrease toward the output shaft. Thus, a transmission with an overall shape suitable for installation in a vehicle, as a FR automatic transmission, can be obtained.

While the first embodiment described above was explained with reference to a multi-speed change mechanism, the invention can be applied to any other automatic speed change mechanism, as long as the mechanism has at least three clutches which are closely positioned.

Second Embodiment

Figure 3:
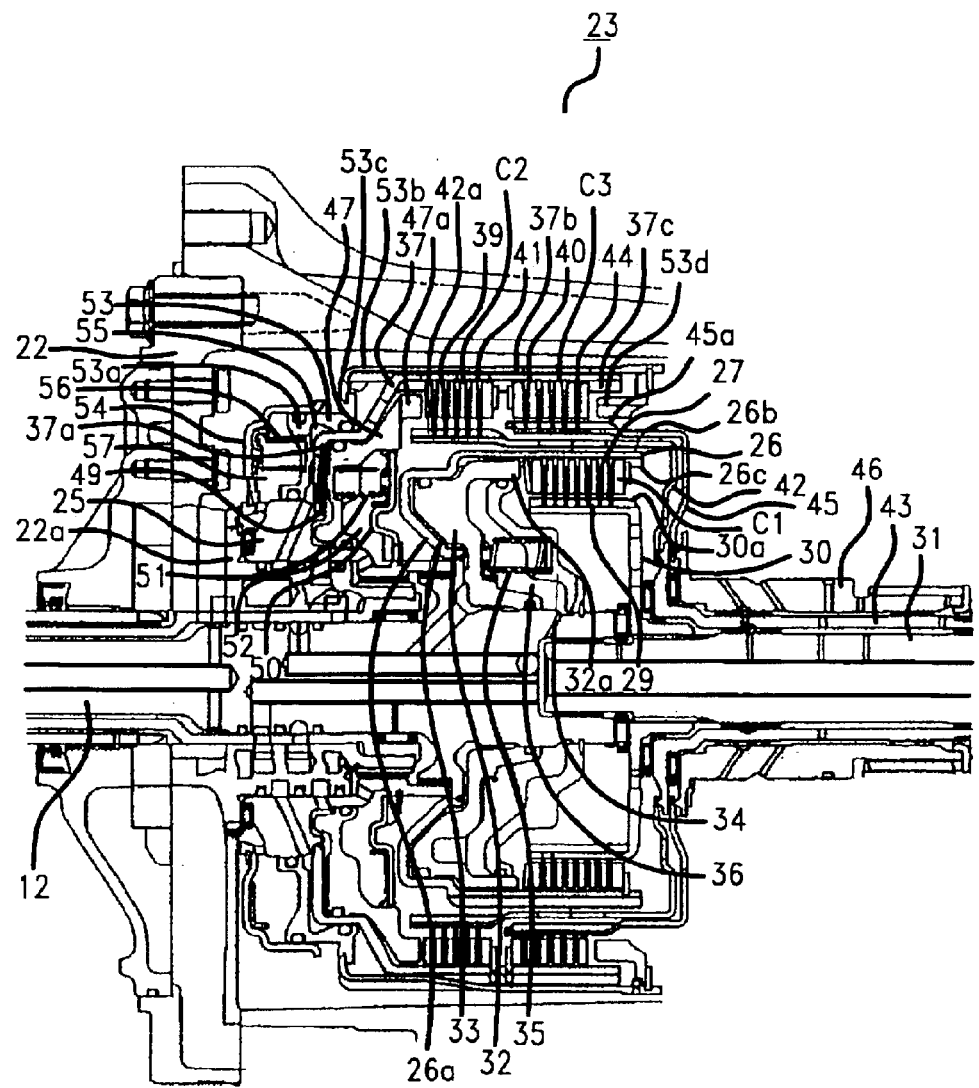
FIG. 3 is an expanded cross-section of a clutch assembly that is the front section of a multi-speed change mechanism of the first embodiment.
Figure 8:
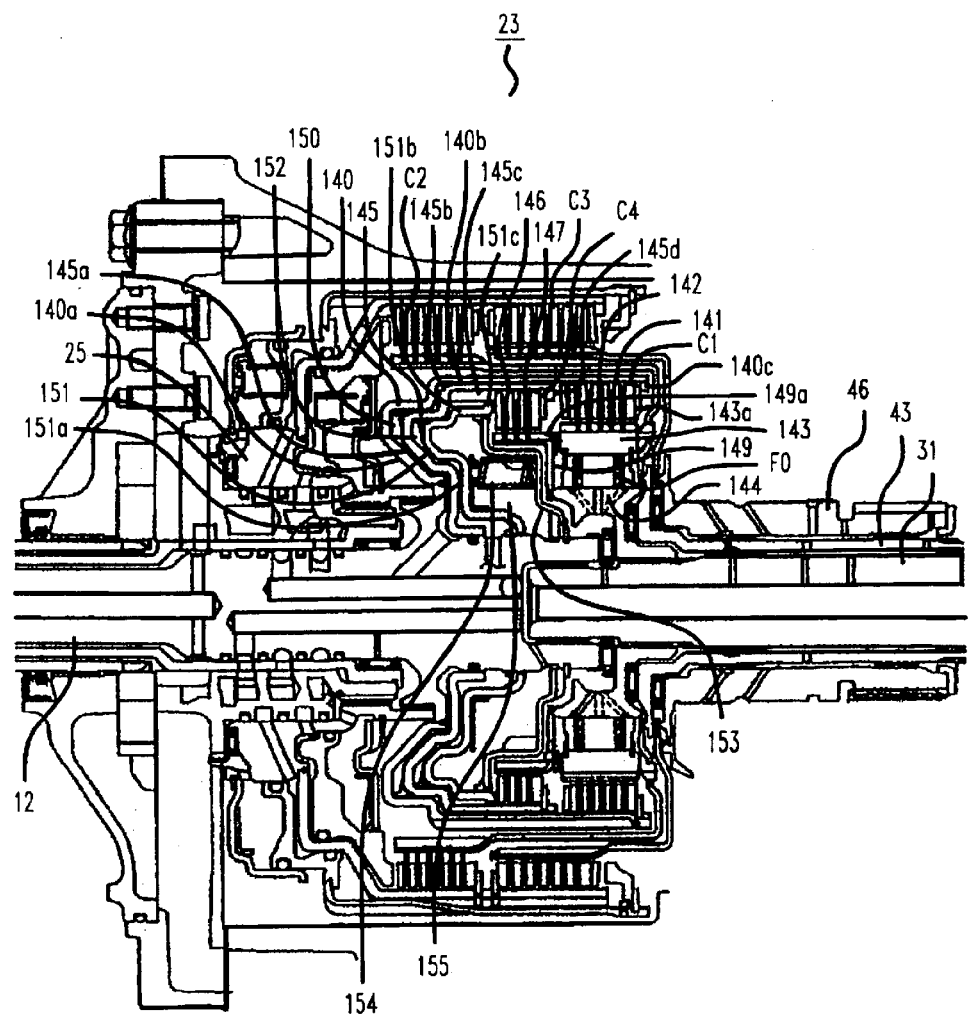
FIG. 8 is an expanded cross-section that shows the clutch assembly that is the front section of the multi-speed change mechanism of a second embodiment.

FIG. 8 shows a second embodiment of the invention and corresponds to FIG. 3 of the first embodiment. Further, in the following explanation, the elements and functions are different from the first embodiment will be explained, and explanation of elements and functions that are the same will be appropriately omitted.

As in the first embodiment, in the second embodiment of the invention, a fourth clutch C4 is positioned on the front side of the first clutch C1 so that the fourth clutch C4 and the first clutch C1 are axially aligned. In addition, the members on the input side of the first and fourth clutches C1 and C4 are integrally formed, and the members on the output side of the fourth clutch C4 and the sun gears S2 and S3 of the second and third planetary gear units 4 and 5 are also integrally formed. Further, a fourth one-way clutch (one-way clutch) F1 is interposed between the output side members of the first clutch C1 and the output side members of the fourth clutch C4.

As shown in FIG. 8, in the second embodiment, a first clutch drum 140 of a first clutch C1 has a flange portion 140a that is fixed to the rear end of the sleeve 25 whose inner diameter side is engaged with the output shaft 12, and a drum portion 140b that extends from flange portion 140a to the back side (rear). A spline 140c is formed on the inner peripheral surface of the drum portion 140b, and plural driven plates (outer friction plates) 141 of the first clutch C1 are engaged with the rear half portion of the spline 140c so as to be axially movable. The driven disks (inner friction plates) 142 that are engaged and disengaged with these drive plates 141, are engaged with a spline 143a that is formed on an outer peripheral surface of an outer race 143 of the fourth one-way clutch F0. An inner race 144 of the fourth one-way clutch F1 is spline-engaged with the outer peripheral surface of the intermediate shaft 31.

Fourth clutch C4 has a fourth clutch drum 145 provided on the inner side of the first clutch drum 140. The fourth clutch drum 145 has a flange portion 145a fixed at its inner periphery to the peripheral surface of the output shaft 12, and a drum portion 145b that extends from the flange portion 145a to the back side. A spline 145c is formed on the inner peripheral surface of the drum portion 145b, and plural drive plates 146 of the fourth clutch C4 are engaged with the spline 145c so as to allow for axial movement. Driven disks 147, that are engaged and disengaged with the drive plates 146, are engaged with a spline 149a, formed on the outer peripheral surface of a fourth hub 149, so as to be axially movable. The inner side of the fourth hub 149 is fixed to the outer peripheral surface of the input shaft 12.

Splines (not shown) formed on the outer peripheral surface of the drum portion 145b of the fourth clutch drum 145 are engaged with the splines 140c of the drum portion 140b of the first clutch drum 140. An end edge 145d of the drum portion 145b is positioned so as to oppose the front side of the first clutch C1. The entire fourth clutch drum 145 is movably supported for axial movement by the first clutch drum 140 and the output shaft 12. An oil-tight fourth oil pressure chamber 150 is formed between the front side of the flange portion 145a and the back side of the flange portion 140a of the first clutch drum 140. The fourth clutch drum 145, in addition to serving as the clutch drum of the fourth clutch C4, also acts as the piston of the first oil pressure actuator that engages and disengages the first clutch C1.

A fourth piston 151 of the fourth oil pressure actuator is provided on the inner side of the fourth clutch drum 145. The fourth piston 151 has a flange portion 151a and a drum portion 151b, and is supported for axial movement by the fourth clutch drum 145 and the peripheral surface of the input shaft 12. The fourth piston 151 is positioned so that an edge 151c of the drum portion 151b opposes the front side of the fourth clutch C4, and an oil-tight fourth oil pressure chamber 152 is formed between the front side of the flange portion 151a and the back side of the flange portion 145a of the fourth clutch drum 145.

A fourth cancel plate 153, having its inner periphery fixed to the outer peripheral surface of the output shaft 12, is provided on the back side of the fourth piston 151. A return spring 154 is compressed between the front side of the cancel plate 153 and the backside of the fourth piston 151 which define a fourth cancel chamber 155 therebetween.

Next, operation of the multi-speed change mechanism 6 will be explained with reference to FIGS. 9 and 10. Further, because the operations other than those of the first and fourth clutches C1 and C4 and the fourth one-way clutch F1 are the same as in the first embodiment, duplicate explanation will be appropriately omitted, and mainly operation of the first and fourth clutches C1 and C4 and the fourth one-way clutch F0 will be explained.

Figure 9:
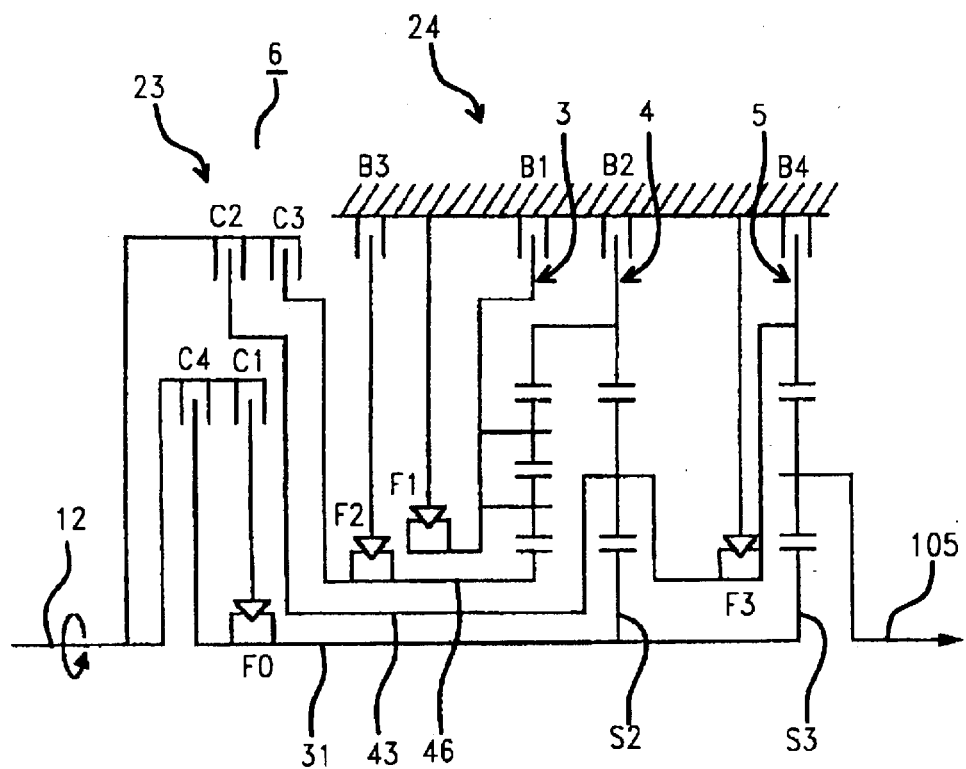
FIG. 9 is a skeletal diagram of the multi-speed change mechanism of the second embodiment.

As shown in FIG. 9, in this second embodiment, the first clutch C1 and the fourth clutch C4 are disposed between the input shaft 12 and the intermediate shaft 31, and, further, the fourth one-way clutch F1 is interposed between the first clutch C1 and the intermediate shaft 31.

If the operational table in FIG. 10 of this second embodiment is compared with the operational table in FIG. 6 of the first embodiment, it can be understood that in this embodiment, in the first through fourth speeds, the fourth clutch C4 is engaged only when engine braking, and the fourth one-way clutch F1 is engaged. Because of this difference, in this embodiment, shifting from the fourth speed to the fifth speed, which is clutch to brake shifting in the first embodiment, can be smoothly performed using a one-way clutch. Also, while torque transmission with engine braking in the first through fourth speeds is through the first clutch C1 in the first embodiment, in this second embodiment it can be through both the first and fourth clutches C1 and C4. Consequently, it is possible to make the first clutch C1 and the first oil pressure actuator that operates it more compact.

Further, while the second embodiment has been explained with reference to the multi-speed change mechanism 6, this second embodiment is applicable to any automatic speed change mechanism so long as the mechanism has a clutch section 23 having at least four clutches which are closely positioned.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The disclosure of Japanese Patent Application No. 2001-391423 filed on Dec. 25, 2001, including the specification, drawings and abstract, is incorporated herein by reference in its entirety.

What is claimed is:

1. An automatic transmission for changing a torque transfer path through a gear section, to thereby change rotational speed of an input member to one of a plurality of shift speeds, and transmitting the rotation at the one shift speed to an output member using a clutch and a holding unit, said automatic transmission having axially opposed front and rear ends defining front and rear end sides for components of the automatic transmission, said automatic transmission comprising:

at least a first clutch, a second clutch and a third clutch which transmit the rotation of the input member to different rotational elements of the gear section, and which are engaged when moving forward and are positioned together with a first oil pressure actuator, a second oil pressure actuator, and a third oil pressure actuator, respectively, to form a clutch section;

wherein the second and third clutches are axially aligned so that the rear end side of the second clutch and the front end side of the third clutch oppose each other, and the first clutch is located radially inside the second and third clutches;

wherein a clutch drum is axially extended to accommodate both the second and third clutches, and wherein by engaging and disengaging the second clutch from the front end side using a second piston of the second oil pressure actuator, and by engaging and disengaging the third clutch from the rear end side using a third piston of the third oil pressure actuator, the first, second and third clutches are separately engaged and disengaged by the first, second and third oil pressure actuators, respectively; and wherein the clutch drum has a flange on the front end side which is sandwiched between the second piston of the second oil pressure actuator and the third piston of the third oil pressure actuator, and wherein the third piston of the third oil pressure actuator has a portion extending axially toward the rear end alone an external surface of said drum to a portion for engaging the third clutch from its rear end side.

2. The automatic transmission according to claim 1, wherein a second oil pressure chamber is formed between the flange portion of the clutch drum and the second piston, and a third oil pressure chamber is formed between the flange portion and the third piston.

3. The automatic transmission according to claim 2, wherein by removing the oil pressure of the third oil pressure chamber while the second and third clutches are engaged, the third clutch is disengaged and the rotational speed of the input member is changed to the highest of the plurality of shift speeds, which highest speed is transmitted to the output member.

4. The automatic transmission according to claim 1, wherein the first clutch is located radially inward of the third clutch and axially overlaps the third clutch.

5. The automatic transmission according to claim 4, wherein a third hub of the third clutch is positioned radially inward of the third clutch, a second hub of the second clutch is positioned radially inward of the third hub, and the first clutch is positioned radially inward of the second hub.

6. The automatic transmission according to claim 5, wherein the first clutch is engaged at or below a forward speed at a direct connection stage, the second clutch is engaged at or above the forward speed at the direct connection stage, and the third clutch is engaged in at least one of the forward speeds and in the reverse speed, whereby the automatic transmission has at least five forward speeds and one reverse speed.

7. The automatic transmission according to claim 6, wherein the first clutch is engaged in first through fourth forward speeds, the second clutch is engaged in at least the fourth and fifth forward speeds, and the third clutch is engaged in the third and fifth forward speeds and in the first reverse speed.

8. The automatic transmission according to claim 7, wherein a first piston of the first actuator is provided on the front end side of the first clutch, and radially inward of the second clutch.

9. The automatic transmission according to claim 8, further comprising:
   a first cancel plate that forms a first cancel chamber in cooperation with the first piston and is positioned on the rear end side of the first piston;
   a first clutch drum having a flange portion that forms a first oil pressure chamber in cooperation with the first piston and is positioned on the front end side of the first piston;
   a second cancel plate of the second actuator that is positioned on the front end side of the flange portion of the first clutch drum;
   a second piston that forms a second cancel chamber in cooperation with the second cancel plate and is positioned on the front end of the second cancel plate; and
   a flange portion of the clutch drum of the second and third clutches that forms the second oil pressure chamber in cooperation with the second piston and is positioned on the front end side of the second piston.

10. The automatic transmission according to claim 7, further comprising a first planetary gear unit that is a dual planetary gear unit and second and third planetary gear units that are simple planetary gear units, the first, the second, the third planetary gear units being interposed between the first, the second, the third clutches and the output member; and first, second, third and fourth holding units that are engaged and disengaged with rotational elements of the first, the second and the third planetary gear units, respectively,
   wherein the first, second and third clutches have input and output sides;
   a member on the output side of the first clutch is integral with a sun gear of the second and the third planetary gear units;
   a member on the output side of the second clutch is integral with a carrier of the second planetary gear unit and a ring gear of the third planetary gear unit is engaged and disengaged by the fourth holding unit;
   a member on the output side of the third clutch is integral with a sun gear of the first planetary gear unit which is engaged and disengaged by the third holding unit;
   the first holding unit is engaged with and disengaged from a carrier of the first planetary gear unit;
   ring gears of the first and the second planetary gear units are integrally formed and engaged and disengaged by the second holding unit;
   a carrier of the third planetary gear unit is integrally formed with the output member;
   a first forward speed is achieved by engagement of the first clutch and the fourth holding unit;
   a second forward speed is achieved by engagement of the first clutch and the first and third holding units;
   a third forward speed is achieved by engagement of the first and third clutches and the first holding unit;
   a fourth forward speed is achieved by engagement of the first and second clutches;
   a fifth forward speed is achieved by engagement of the second and third clutches and the first holding unit; and
   a reverse speed is achieved by engagement of the third clutch and the first and fourth holding units.

11. The automatic transmission according to claim 10, wherein a sixth forward speed is achieved by engagement of the second clutch and the second holding unit.

12. The automatic transmission according to claim 11, wherein a fourth clutch is axially aligned with and positioned on the front end side of the first clutch, the members on the output side of the first and fourth clutches are integrally structured, the member on the output side of the fourth clutch and the sun gears of the second and the third planetary gear units are integrally structured, and a one-way clutch is interposed between the member on the output side of the first clutch and the member on the output side of the fourth clutch.

13. The automatic transmission according to claim 11, wherein the fourth clutch is axially aligned with and positioned on the front side of the first clutch, the members on the output side of the first and fourth clutches are integrally structured, the member on the output side of the fourth clutch and the sun gears of the second and the third planetary gear units are integrally structured, and a one-way clutch is interposed between the member on the output side of the first clutch and the member on the output side of the fourth clutch.

14. An automatic transmission for changing a torque transfer path through a gear section, to thereby change rotational speed of an input member to one of a plurality of shift speeds, and transmitting the rotation at the one shift speed to an output member using a clutch and a holding unit, said automatic transmission comprising:
   at least a first clutch, a second clutch and a third clutch which transmit the rotation of the input member to different rotational elements of the gear section, and which are engaged when moving forward and are positioned together with a first oil pressure actuator, a second oil pressure actuator, and a third oil pressure actuator, respectively, to form a clutch section;
   wherein the second and third clutches are axially aligned and the first clutch is located radially inside the second and third clutches;

wherein a clutch drum is axially extended to accommodate both the second and third clutches;

wherein the third oil pressure actuator includes a third piston, said third piston having a head portion in an operating chamber of said third oil pressure actuator located at a first axial end of the axially aligned second and third clutches, having an engaging element located at a second axial end, opposite said first axial end, of the axially aligned second and third clutches, and having a connection portion connecting said head portion and said engaging element;

wherein by engaging and disengaging the second clutch from the first axial end using a second piston of the second oil pressure actuator, and by engaging and disengaging the third clutch from the second axial end using the engaging element of the third piston of the third oil pressure actuator, the first, second and third clutches are separately engaged and disengaged by the first, second and third oil pressure actuators, respectively; and wherein the clutch drum has a flange on the front end side which is sandwiched between the second piston of the second oil pressure actuator and the third piston of the third oil pressure actuator, and wherein the third piston of the third oil pressure actuator has a portion extending axially toward the rear end along an external surface of said drum to a portion for engaging the third clutch from its rear end side.

15. The automatic transmission according to claim 14, wherein said connection portion of the third piston extends from said head portion axially along an external surface of said drum to said engaging element for engaging the third clutch from its second axial end.

16. An automatic transmission for changing a torque transfer path through a gear section, to thereby change rotational speed of an input member to one of a plurality of shift speeds, and transmitting the rotation at the one shift speed to an output member using a clutch and a holding unit, said automatic transmission having axially opposed front and rear ends defining front and rear end sides for components of the automatic transmission, said automatic transmission comprising:

at least a first clutch, a second clutch and a third clutch which transmit the rotation of the input member to different rotational elements of the gear section, and which are engaged when moving forward and are positioned together with a first oil pressure actuator, a second oil pressure actuator, and a third oil pressure actuator, respectively, to form a clutch section;

wherein the second and third clutches are axially aligned so that the rear end side of the second clutch and the front end side of the third clutch oppose each other, and the first clutch is located radially inside the second and third clutches;

wherein a clutch drum is axially extended to accommodate both the second and third clutches, and wherein by engaging and disengaging the second clutch from the front end side using a second piston of the second oil pressure actuator, and by engaging and disengaging the third clutch from the rear end side using a third piston of the third oil pressure actuator, the first, second and third clutches are separately engaged and disengaged by the first, second and third oil pressure actuators, respectively;

wherein the first clutch is located radially inward of the third clutch and axially overlaps the third clutch; and wherein a third hub of the third clutch is positioned radially inward of the third clutch, a second hub of the second clutch is positioned radially inward of the third hub, and the first clutch is positioned radially inward of the second hub.

17. The automatic transmission according to claim 16, wherein the first clutch is engaged at or below a forward speed at a direct connection stage, the second clutch is engaged at or above the forward speed at the direct connection stage, and the third clutch is engaged in at least one of the forward speeds and in the reverse speed, whereby the automatic transmission has at least five forward speeds and one reverse speed.

18. The automatic transmission according to claim 17, wherein the first clutch is engaged in first through fourth forward speeds, the second clutch is engaged in at least the fourth and fifth forward speeds, and the third clutch is engaged in the third and fifth forward speeds and in the first reverse speed.

19. The automatic transmission according to claim 18, wherein a first piston of the first actuator is provided on the front end side of the first clutch, and radially inward of the second clutch.

20. The automatic transmission according to claim 19, further comprising:

a first cancel plate that forms a first cancel chamber in cooperation with the first piston and is positioned on the rear end side of the first piston;

a first clutch drum having a flange portion that forms a first oil pressure chamber in cooperation with the first piston and is positioned on the front end side of the first piston;

a second cancel plate of the second actuator that is positioned on the front end side of the flange portion of the first clutch drum;

a second piston that forms a second cancel chamber in cooperation with the second cancel plate and is positioned on the front end of the second cancel plate; and a flange portion of the clutch drum of the second and third clutches that forms the second oil pressure chamber in cooperation with the second piston and is positioned on the front end side of the second piston.

21. The automatic transmission according to claim 18, further comprising a first planetary gear unit that is a dual planetary gear unit and second and third planetary gear units that are simple planetary gear units, the first, the second, the third planetary gear units being interposed between the first, the second, the third clutches and the output member; and first, second, third and fourth holding units that are engaged and disengaged with rotational elements of the first, the second and the third planetary gear units, respectively, wherein the first, second and third clutches have input and output sides;

a member on the output side of the first clutch is integral with a sun gear of the second and the third planetary gear units;

a member on the output side of the second clutch is integral with a carrier of the second planetary gear unit and a ring gear of the third planetary gear unit is engaged and disengaged by the fourth holding unit;

a member on the output side of the third clutch is integral with a sun gear of the first planetary gear unit which is engaged and disengaged by the third holding unit;

the first holding unit is engaged with and disengaged from a carrier of the first planetary gear unit;

ring gears of the first and the second planetary gear units are integrally formed and engaged and disengaged by the second holding unit;

a carrier of the third planetary gear unit is integrally formed with the output member;

a first forward speed is achieved by engagement of the first clutch and the fourth holding unit;

a second forward speed is achieved by engagement of the first clutch and the first and third holding units;

a third forward speed is achieved by engagement of the first and third clutches and the first holding unit;

a fourth forward speed is achieved by engagement of the first and second clutches;

a fifth forward speed is achieved by engagement of the second and third clutches and the first holding unit; and a reverse speed is achieved by engagement of the third clutch and the first and fourth holding units.

22. The automatic transmission according to claim 21, wherein a sixth forward speed is achieved by engagement of the second clutch and the second holding unit.

23. The automatic transmission according to claim 22, wherein a fourth clutch is axially aligned with and positioned on the front end side of the first clutch, the members on the output side of the first and fourth clutches are integrally structured, the member on the output side of the fourth clutch and the sun gears of the second and the third planetary gear units are integrally structured, and a one-way clutch is interposed between the member on the output side of the first clutch and the member on the output side of the fourth clutch.

24. The automatic transmission according to claim 22, wherein the fourth clutch is axially aligned with and positioned on the front side of the first clutch, the members on the output side of the first and fourth clutches are integrally structured, the member on the output side of the fourth clutch and the sun gears of the second and the third planetary gear units are integrally structured, and a one-way clutch is interposed between the member on the output side of the first clutch and the member on the output side of the fourth clutch.

25. An automatic transmission for changing a torque transfer path through a gear section, to thereby change rotational speed of an input member to one of a plurality of shift speeds, and transmitting the rotation at the one shift speed to an output member using a clutch and a holding unit, said automatic transmission comprising:

at least a first clutch, a second clutch and a third clutch which transmit the rotation of the input member to different rotational elements of the gear section, and which are engaged when moving forward and are positioned together with a first oil pressure actuator, a second oil pressure actuator, and a third oil pressure actuator, respectively, to form a clutch section;

wherein the second and third clutches are axially aligned and the first clutch is located radially inside the second and third clutches;

wherein a clutch drum is axially extended to accommodate both the second and third clutches;

wherein the third oil pressure actuator includes a third piston, said third piston having a head portion in an operating chamber of said third oil pressure actuator located at a first axial end of the axially aligned second and third clutches, having an engaging element located at a second axial end, opposite said first axial end of the axially aligned second and third clutches, and having a connection portion connecting said head portion and said engaging element;

wherein by engaging and disengaging the second clutch from the first axial end using a second piston of the second oil pressure actuator, and by engaging and disengaging the third clutch from the second axial end side, opposite said first axial end, using the engaging element of the third piston of the third oil pressure actuator, the first, second and third clutches are separately engaged and disengaged by the first, second and third oil pressure actuators, respectively;

wherein the first clutch is located radially inward of the third clutch and axially overlaps the third clutch; and wherein a third hub of the third clutch is positioned radially inward of the third clutch, a second hub of the second clutch is positioned radially inward of the third hub, and the first clutch is positioned radially inward of the second hub.

26. The automatic transmission according to claim 25, wherein said connection portion of the third piston extends from said head portion axially along an external surface of said drum to said engaging element for engaging the third clutch from its second axial end.

* * * * *

UNITED STATES PATENT AND TRADEMARK OFFICE
CERTIFICATE OF CORRECTION

PATENT NO. : 6,878,086 B2  Page 1 of 1
DATED : April 12, 2005
INVENTOR(S) : Sugiura et al.

It is certified that error appears in the above-identified patent and that said Letters Patent is hereby corrected as shown below:

Title page,
Item [56], References Cited, FOREIGN PATENT DOCUMENTS, add:
-- JP 2000-145899    6/1998
  JP 2001-227635    10/2000
  EP 1,013,968 A3    4/1999 --.

Column 20,
Line 60, "alone" should read -- along --.

Signed and Sealed this

Second Day of May, 2006

JON W. DUDAS
*Director of the United States Patent and Trademark Office*